(12) United States Patent
Filsfils et al.

(10) Patent No.: US 7,983,153 B2
(45) Date of Patent: Jul. 19, 2011

(54) FAST REROUTE (FRR) PROTECTION AT THE EDGE OF A RFC 2547 NETWORK

(75) Inventors: Clarence Filsfils, Brussels (BE); Stefano B. Previdi, Rome (IT); John Galen Scudder, Ann Arbor, MI (US); David D. Ward, Los Gatos, CA (US); Jean-Philippe Vasseur, Dunstable, MA (US); Jim Guichard, Groton, MA (US)

(73) Assignee: Cisco Technology, Inc., San Jose, CA (US)

( * ) Notice: Subject to any disclaimer, the term of this patent is extended or adjusted under 35 U.S.C. 154(b) by 58 days.

(21) Appl. No.: 12/481,411

(22) Filed: Jun. 9, 2009

(65) Prior Publication Data

US 2009/0245259 A1  Oct. 1, 2009

Related U.S. Application Data

(63) Continuation of application No. 11/010,225, filed on Dec. 10, 2004, now Pat. No. 7,551,551.

(51) Int. Cl.
*H04J 1/16* (2006.01)
*H04J 3/14* (2006.01)
*H04L 1/00* (2006.01)
*H04L 12/26* (2006.01)

(52) U.S. Cl. ......... 370/219; 370/220; 370/221; 370/228
(58) Field of Classification Search .......... 370/217–221, 370/225, 228, 389, 392
See application file for complete search history.

(56) References Cited

U.S. PATENT DOCUMENTS

| | | | |
|---|---|---|---|
| 6,339,595 B1 | 1/2002 | Rekhter et al. | |
| 6,611,872 B1 | 8/2003 | McCanne | |
| 6,665,273 B1 | 12/2003 | Goguen et al. | |
| 6,778,492 B2 | 8/2004 | Charny et al. | |
| 7,023,825 B1 | 4/2006 | Haumont et al. | |
| 7,185,256 B2 | 2/2007 | Miki et al. | |
| 7,260,096 B2 | 8/2007 | Basso et al. | |
| 7,283,529 B2 | 10/2007 | Basso et al. | |
| 7,284,068 B1 | 10/2007 | Ramalho | |
| 7,551,551 B2 | 6/2009 | Filsfils et al. | |
| 2001/0010681 A1 | 8/2001 | McAllister et al. | |

(Continued)

OTHER PUBLICATIONS

International Application No. PCT/US05/41795, International Filing Date Nov. 17, 2005, Notification of Transmittal of the International Search Report and The Written Opinion of the International Searching Authority, or the Declaration, Mailed Oct. 24, 2006, 8 pgs.

(Continued)

*Primary Examiner* — Ronald Abelson
(74) *Attorney, Agent, or Firm* — Cesari and McKenna, LLP (57) ABSTRACT

In one embodiment, an edge device in a first routing domain is configured to communicate with a second routing domain via a data link. The edge device receives a data packet containing a destination address that is reachable via the second routing domain and an indication that the data packet is a protected packet that was previously rerouted from another edge device in the first routing domain via a Multi-Protocol Label Switching (MPLS) Fast Reroute (FRR) backup path. The edge device determines if communication with the second routing domain is still available via the data link, and if so, removes the indication that the data packet is a protected packet and forwards the data packet to the second routing domain, and, if not, drops the data packet to prevent the data packet from being rerouted a second time in the first routing domain on another MPLS FRR backup path.

20 Claims, 8 Drawing Sheets

U.S. PATENT DOCUMENTS

| | | |
|---|---|---|
| 2002/0060985 A1 | 5/2002 | Lee et al. |
| 2002/0112072 A1 | 8/2002 | Jain |
| 2003/0028818 A1 | 2/2003 | Fujita |
| 2003/0135645 A1 | 7/2003 | Oki et al. |
| 2003/0177263 A1 | 9/2003 | Robinson |
| 2003/0233595 A1 | 12/2003 | Charny et al. |
| 2004/0052207 A1 | 3/2004 | Charny et al. |
| 2004/0085954 A1 | 5/2004 | Iacovino et al. |
| 2004/0109687 A1 | 6/2004 | Park et al. |
| 2004/0196827 A1 | 10/2004 | Xu et al. |
| 2005/0232281 A1 | 10/2005 | Rosenzweig et al. |
| 2006/0209682 A1 | 9/2006 | Filsfils et al. |

OTHER PUBLICATIONS

Pan, "Fast Reroute Extensions," Aug. 2003.

| ADDRESS PREFIX 520 | VPN LABEL VALUE 530 | VRF IDENTIFIER 540 | FRR ENABLE FLAG 550 | FRR EXCLUDE FLAG 560 | BACKUP PE DEVICE 570 | BACKUP LABEL STACK (IGP LABEL, VPN LABEL) 580 |
|---|---|---|---|---|---|---|
| 10.1.2.0/24 | 57 | 1 | 1 | 0 | PE2 | 100, 75 |
| ... | ... | ... | ... | ... | ... | ... |

MPLS FORWARDING TABLE 500

FAST REROUTE (FRR) PROTECTION AT THE EDGE OF A RFC 2547 NETWORK

RELATED APPLICATIONS

This application for United States patent is a continuation of U.S. patent application Ser. No. 11/010,225, now issued as U.S. Pat. No. 7,551,551, filed on Dec. 10, 2004 by Clarence Filsfils et al., and entitled FAST REROUTE (FRR) PROTECTION AT THE EDGE OF A RFC 2547 NETWORK, which is also incorporated herein by reference in its entirety.

FIELD OF THE INVENTION

This invention relates generally to routing data between private routing domains, and, more specifically, to a fast reroute (FRR) technique that quickly and efficiently reroutes network traffic to a neighboring exit point in the event of a node or link failure.

BACKGROUND OF THE INVENTION

A computer network is a geographically distributed collection of interconnected subnetworks, such as local area networks (LAN) that transport data between network nodes. As used herein, a network node is any device adapted to send and/or receive data in the computer network. Thus, in this context, "node" and "device" may be used interchangeably. The network topology is defined by an arrangement of network nodes that communicate with one another, typically through one or more intermediate nodes, such as routers and switches. In addition to intra-network communications, data also may be exchanged between neighboring (i.e., adjacent) networks. To that end, "edge devices" located at the logical outer-bound of the computer network may be adapted to send and receive inter-network communications. Both inter-network and intra-network communications are typically effected by exchanging discrete packets of data according to predefined protocols. In this context, a protocol consists of a set of rules defining how network nodes interact with each other.

Each data packet typically comprises "payload" data prepended ("encapsulated") by at least one network header formatted in accordance with a network communication protocol. The network headers include information that enables network nodes to efficiently route the packet through the computer network. Often, a packet's network headers include a data-link (layer 2) header, an internetwork (layer 3) header and a transport (layer 4) header as defined by the Transmission Control Protocol/Internet Protocol (TCP/IP) Reference Model. The TCP/IP Reference Model is generally described in more detail in Section 1.4.2 of the reference book entitled *Computer Networks, Fourth Edition*, by Andrew Tanenbaum, published 2003, which is hereby incorporated by reference as though fully set forth herein.

A data packet may originate at a source node and subsequently "hop" from node to node along a logical data path until it reaches its addressed destination node. The network addresses defining the logical data path of a data flow are most often stored as Internet Protocol (IP) addresses in the packet's internetwork header. IP addresses are typically formatted in accordance with the IP Version 4 (IPv4) protocol, in which network nodes are addressed using 32 bit (four byte) values. Specifically, the IPv4 addresses are denoted by four numbers between 0 and 255, each number usually delineated by a "dot." A subnetwork may be assigned to an IP address space containing a predetermined range of IPv4 addresses. For example, an exemplary subnetwork may be allocated the address space 128.0.10.*, where the asterisk is a wildcard that can differentiate up to 254 individual nodes in the subnetwork (0 and 255 are reserved values). For instance, a first node in the subnetwork may be assigned to the IP address 128.0.10.1, whereas a second node may be assigned to the IP address 128.0.10.2.

A subnetwork is associated with a subnet mask that may be used to select a set of contiguous high-order bits from IP addresses within the subnetwork's allotted address space. A subnet mask length indicates the number of contiguous high-order bits selected by the subnet mask, and a subnet mask length of N bits is hereinafter represented as /N. The subnet mask length for a given subnetwork is typically selected based on the number of bits required to distinctly address nodes in that subnetwork. Subnet masks and their uses are more generally described in Chapter 9 of the reference book entitled *Interconnections Second Edition*, by Radia Perlman, published January 2000, which is hereby incorporated by reference as though fully set forth herein.

By way of example, assume an exemplary subnetwork is assigned the IP address space 128.0.10.4, and the subnetwork contains two addressable (reachable) network nodes. In this case, 30 address bits are needed to identify the subnetwork 128.0.10.4, and the remaining two address bits are required to distinctly address either of the two nodes in the subnetwork. Thus, the subnetwork may be associated with a subnet mask length of /30 since only the first 30 most-significant bits of an IP address are required to uniquely address this subnetwork. As used herein, an "address prefix" is defined as the result of applying a subnet mask to a network address. For example, consider the address prefix 128.0.10.1/24. In this case, the network portion of the prefix contains the 24 most-significant bits of the IP address 128.0.10.1, i.e., the network is 128.0.10.0, and the last 8 bits are used to identify hosts on that network. An IP address and an address prefix are said to "match" when the prefix's network portion equals the IP address's most-significant bits.

Interior Gateway Protocols

A computer network may contain smaller groups of one or more subnetworks which may be managed as separate routing domains. As used herein, a routing domain is broadly construed as a collection of interconnected network nodes under a common administration. Often, a routing domain is managed by a single administrative entity, such as a company, an academic institution or a branch of government. Such a centrally-managed routing domain is sometimes referred to as an "autonomous system." In general, a routing domain may operate as an enterprise network, a service provider or any other type of network or subnetwork. Further, the routing domain may contain one or more edge devices having "peer" connections to edge devices in adjacent routing domains.

Network nodes in a routing domain are typically configured to forward data using predetermined paths from "interior gateway" routing protocols, such as conventional link-state protocols and distance-vector protocols. These interior gateway protocols (IGP) define the manner with which routing information and network-topology information is exchanged and processed in the routing domain. For instance, IGP protocols typically provide a mechanism for distributing a set of reachable IP subnetworks among the intermediate nodes in the routing domain. As such, each intermediate node receives a consistent "view" of the domain's topology. Examples of link-state and distance-vectors protocols known in the art, such as the Open Shortest Path First (OSPF) protocol and Routing Information Protocol (RIP), are described in Sections 12.1-12.3 of the reference book entitled *Interconnec-*

*tions, Second Edition*, by Radia Perlman, published January 2000, which is hereby incorporated by reference as though fully set forth herein.

The Border Gateway Protocol (BGP) is usually employed as an "external gateway" routing protocol for routing data between autonomous systems. The BGP protocol is well known and generally described in Request for Comments (RFC) 1771, entitled *A Border Gateway Protocol 4 (BGP-4)*, by Y. Rekhter et al., published March 1995, which is publicly available through the Internet Engineering Task Force (IETF) and is hereby incorporated by reference in its entirety. A variation of the BGP protocol, known as internal BGP (iBGP), is often used to distribute inter-network reachability information (address prefixes) among devices in a routing domain. To implement iBGP, the devices must be "fully meshed," i.e., such that every device is coupled to every other device by way of a TCP connection. In practice, conventional route reflectors are used to logically couple devices into a full mesh. The BGP protocol also may be extended for compatibility with other services other than standard Internet connectivity. For instance, Multi-Protocol BGP (MP-BGP) supports various address family identifier (AFI) fields that permit BGP messages to transport multi-protocol information, such as is the case with RFC 2547 services.

A network node in a routing domain may detect a change in the domain's topology. For example, the node may become unable to communicate with one of its neighboring nodes, e.g., due to a link failure between the nodes or the neighboring node failing, such as going "off line" for repairs. If the detected node or link failure occurred within the routing domain, the detecting node may advertise the intra-domain topology change to other nodes in the domain using an interior gateway protocol, such as OSPF. Similarly, if an edge device detects a node or link failure that prevents communications with a neighboring routing domain, the edge device may disseminate the inter-domain topology change to its other fully-meshed edge devices, e.g., using the iBGP protocol. In either case, there is an inherent latency of propagating the network-topology change within the routing domain and having nodes in the domain converge on a consistent view of the new network topology, i.e., without the failed node or link.

Multi-Protocol Label Switching/Virtual Private Network Architecture

A virtual private network (VPN) is a collection of network nodes that establish private communications over a shared backbone network. Previously, VPNs were implemented by embedding private leased lines in the shared network. The leased lines (i.e., communication links) were reserved only for network traffic among those network nodes participating in the VPN. Today, the above-described VPN implementation has been mostly replaced by private "virtual circuits" deployed in public networks. Specifically, each virtual circuit defines a logical end-to-end data path between a pair of network nodes participating in the VPN. When the pair of nodes is located in different routing domains, edge devices in a plurality of interconnected routing domains may have to cooperate to establish the nodes' virtual circuit.

A virtual circuit may be established using, for example, conventional layer-2 Frame Relay (FR) or Asynchronous Transfer Mode (ATM) networks. Alternatively, the virtual circuit may "tunnel" data between its logical end points using known layer-2 and/or layer-3 tunneling protocols, such as the Layer-2 Tunneling Protocol (L2TP) and the Generic Routing Encapsulation (GRE) protocol. In this case, one or more tunnel headers are prepended to a data packet to appropriately route the packet along the virtual circuit. The Multi-Protocol Label Switching (MPLS) protocol may be used as a tunneling mechanism for establishing layer-2 virtual circuits or layer-3 network-based VPNs through an IP network.

MPLS enables network nodes to forward packets along predetermined "label switched paths" (LSP). Each LSP defines a logical data path, or virtual circuit, between a pair of source and destination nodes; the set of network nodes situated along the LSP may be determined using reachability information provided by conventional interior gateway protocols, such as OSPF. Unlike traditional IP routing, where node-to-node ("next hop") forwarding decisions are performed based on destination IP addresses, MPLS-configured nodes instead forward data packets based on "label" values (or "tag" values) added to the IP packets. As such, a MPLS-configured node can perform a label-lookup operation to determine a packet's next-hop destination. MPLS traffic engineering provides additional advantages over IP-based routing, such as enabling MPLS-configured nodes to reserve network resources, such as bandwidth, to ensure a desired quality of service (QoS).

Each destination represented via a LSP is associated with a locally allocated label value at each hop of the LSP, such that the locally allocated label value is carried by data packets forwarded over its associated hop. The MPLS label values are typically distributed among the LSP's nodes using, e.g., the Label Distribution Protocol (LDP), Resource Reservation Protocol (RSVP) or MP-BGP protocol. Operationally, when a data packet is received at a MPLS-configured node, the node extracts the packet's transported label value, e.g., stored at a known location in the packet's encapsulating headers. The extracted label value is used to identify the next network node to forward the packet. The packet may contain a "stack" of labels such that the stack's top-most label determines the packet's next-hop destination. The packet's extracted label value is replaced with a new label value associated with the packet's next hop. This process is repeated for every logical hop along the LSP until the packet reaches its destination node. The above-described MPLS operation is described in more detail in Chapter 7 of the reference book entitled *IP Switching and Routing Essentials*, by Stephen Thomas, published 2002, which is hereby incorporated by reference as though fully set forth herein.

Layer-3 network-based VPN services that utilize MPLS technology are often deployed by network service providers for one or more customer sites. These networks are typically said to provide "MPLS/VPN" services. As used herein, a customer site is broadly defined as a routing domain containing at least one customer edge (CE) device coupled to a provider edge (PE) device in the service provider's network ("provider network"). The customer site may be multi-homed to the provider network, i.e., wherein one or more of the customer's CE devices is coupled to a plurality of PE devices. The PE and CE devices are generally intermediate network nodes, such as routers or switches, located at the edge of their respective networks. The PE-CE data links may be established over various physical mediums, such as conventional wire links, optical links, wireless links, etc., and may communicate data formatted using various network communication protocols including ATM, Frame Relay, Ethernet, Fibre Distributed Data Interface (FDDI), etc. In addition, the PE and CE devices may be configured to exchange routing information over their respective PE-CE links in accordance with various interior and exterior gateway protocols, such as BGP, OSPF, RIP, etc.

In the traditional MPLS/VPN network architecture, each customer site may participate in one or more different VPNs. Most often, each customer site is associated with a single VPN, and hereinafter the illustrative embodiments will assume a one-to-one correspondence between customer sites and VPNs. For example, customer sites owned or managed by a common administrative entity, such as a corporate enterprise, may be statically assigned to the enterprise's VPN. As such, network nodes situated in the enterprise's various customer sites participate in the same VPN and are therefore permitted to securely communicate with one another via the provider network. In other words, the provider network establishes the necessary LSPs to interconnect the customer sites participating in the enterprise's VPN. Likewise, the provider network also may establish LSPs that interconnect customer sites participating in other VPNs. This widely-deployed MPLS/VPN architecture is generally described in more detail in Chapters 8-9 of the reference book entitled *MPLS and VPN Architecture, Volume* 1, by I. Pepelnjak et al., published 2001 and in the IETF publication RFC 2547, entitled *BGP/MPLS VPNs*, by E. Rosen et al., published March 1999, each of which is hereby incorporated by reference as though fully set forth herein.

Figure 1:
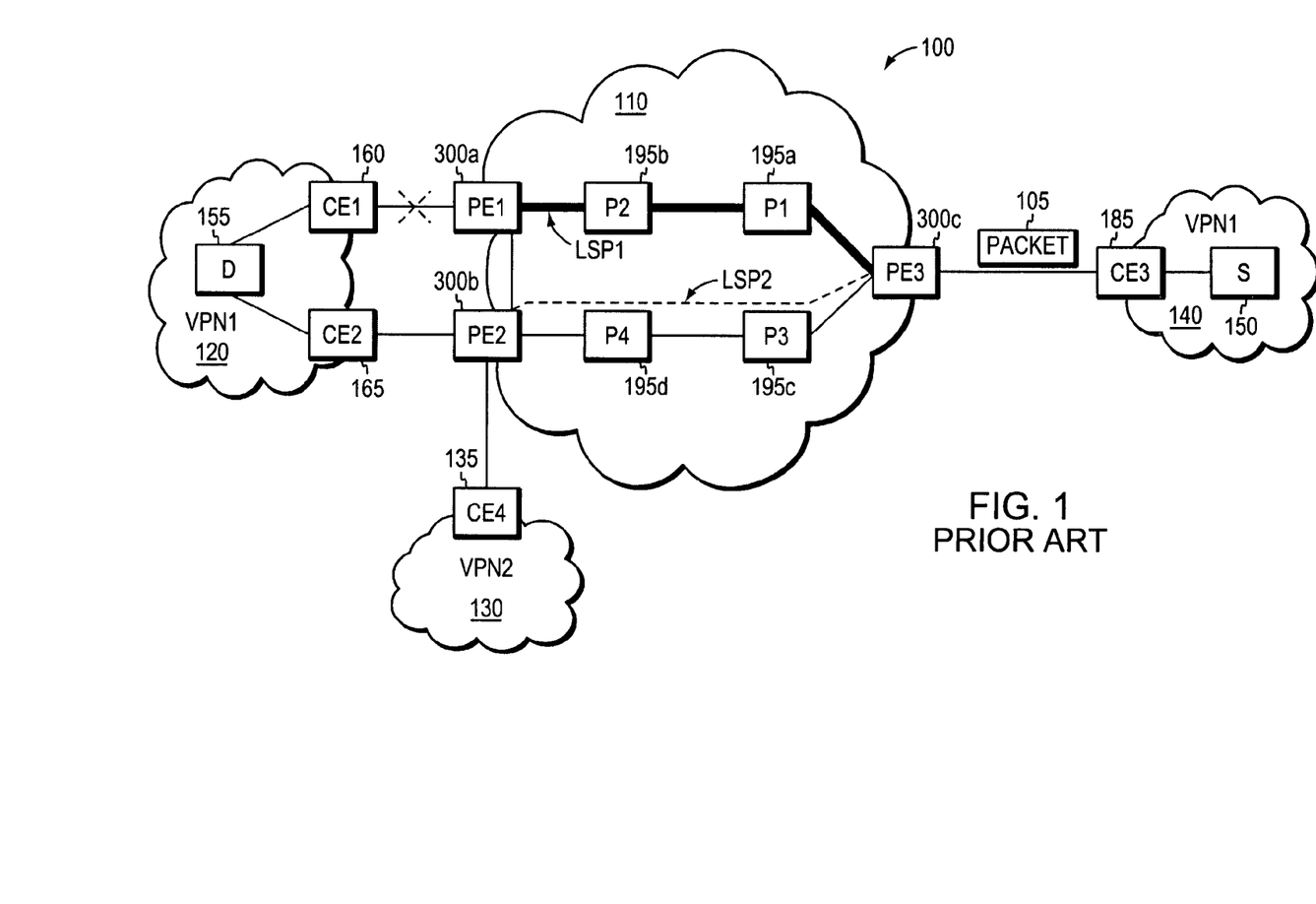
FIG. 1, previously described, is a schematic block diagram of a MPLS/VPN network topology.

FIG. 1 illustrates an exemplary MPLS/VPN network 100 containing a provider network 110 coupled to neighboring customer sites 120, 130 and 140. The provider network includes a plurality of PE devices 300, including devices PE1 300a, PE2 300b and PE3 300c. The PE devices are fully meshed at the BGP level. That is, each PE device in the provider network can communicate with every other PE device (either directly or by means of BGP route reflectors). The network 110 also contains "core" provider (P) devices 195a-d, such as routers, which are respectively labeled P1, P2, P3 and P4. These P devices may be used to establish label switched paths between pairs of PE devices. For example, the provider devices P1 and P2 may be used to establish a first LSP1 between PE3 to PE1 and the devices P3 and P4 may be used to establish a second LSP2 between PE3 and PE2.

Each neighboring customer site 120-140 contains one or more CE devices attached to PE devices in the provider network 110. For instance, the customer site 120 contains CE devices 160 and 165 (labeled CE1 and CE2) which are respectively coupled to PE1 and PE2. Similarly, the customer site 130 includes a CE device 135 (labeled CE4) attached to PE2 and the customer site 140 includes a CE device 185 (labeled CE3) attached to PE3. The customer sites 120-140 are assigned to respective VPNs. For purposes of illustration, the customer sites 120 and 140 are assigned to the VPN1 and the customer site 130 is assigned to the VPN2. In this arrangement, network nodes in the customer sites 120 and 140 (VPN1) may not establish communications with nodes in the customer site 130 (VPN2) and vice versa since they participate in different VPNs. However, network nodes in the customer site 120 may communicate with nodes in the customer site 140, and vice versa, since the customer sites 120 and 140 both participate in VPN1. Notably, VPN1 and VPN2 may contain overlapping IP address spaces.

As noted, communications may be established through the MPLS/VPN network 100 between remote customer sites participating in the same VPN, e.g., VPN1. The provider network 110 may create a MPLS tunnel, such as LSP1 or LSP2, to provide a logical data path between the remote customer sites of VPN1. Suppose a source node (S) 150 in the customer site 140 addresses a data packet 105 to a destination node (D) 155 in the customer site 120. The source node forwards the packet to its local customer edge device CE3, which in turn transfers the packet across domain boundaries to the provider edge device PE3. PE3 then determines an appropriate LSP over which to forward the packet through the provider network 110 to the customer site 120 containing the packet's addressed destination node 155.

The provider edge device PE3 may associate the received packet 105 with a LSP based on the packet's contained destination IP address. For purposes of discussion, assume the packet 105 is routed from PE3 to PE1 via LSP1, as shown in bold. The packet is received by the provider edge device PE1 at the tail-end of the LSP1 and the packet is then forwarded over the PE1-CE1 link to CE1 in the customer site 120. CE1 receives the packet and forwards it to the destination node 155.

Problems arise in the conventional MPLS/VPN architecture when a node or link failure prevents data communications over a PE-CE data link. For example, suppose that the PE1-CE1 link fails as denoted by a dotted "X." After identifying the failure, the provider edge device PE1 may advertise, within the provider network 110, that it has lost reachability to the IP addresses previously advertised by CE devices in the customer site 120. Accordingly, PE1 may propagate the identified routing change by disseminating iBGP update messages to its fully-meshed PE devices. Eventually, the routing change is distributed throughout the provider network 110 and each PE device updates its local routing information to converge on the new network topology, i.e., without the failed PE1-CE1 link.

The conventional latency required for the PE devices to converge on the new network topology, i.e., without the PE1-CE1 link, is often overly time consuming, e.g., on the order of seconds, and causes a number of significant problems. For instance, data packets are often "dropped" (i.e., discarded) at the edge of the provider network while the network is in the process of converging. For example, in response to the PE1-CE1 link failing, data packets 105 addressed to the destination node 155 will be dropped by PE1 (at the tail-end of LSP1) until the network converges on an alternate data path LSP2 for those packets. For many data flows, such as voice-over-IP (VoIP) and video data flows, this temporary loss of data at PE1 may significantly degrade the utility of the overall data transfer or may cause the data flow to time-out and stop completely.

It is therefore generally desirable for MPLS/VPN networks to achieve faster convergence times, e.g., sub-second convergence times, in response to CE node or link failures over PE-CE links. The MPLS/VPN networks should quickly converge on the new network topology with minimal data loss at the edge of the network.

SUMMARY OF THE INVENTION

The present invention overcomes the disadvantages of the prior art by providing a fast reroute (FRR) technique that may be deployed at the edge of a network having first and second edge devices coupled to a neighboring routing domain. In accordance with the inventive technique, if the first edge device detects a node or link failure that prevents it from communicating with the neighboring domain, the first edge device reroutes at least some data packets addressed to the neighboring domain to the second edge device. Preferably, the rerouted packets are "tunneled" to the second edge device, e.g., using an IP or MPLS tunneling mechanism. The second edge device receives the rerouted packets and then forwards the packets to the neighboring domain. Notably, the second edge device is not permitted to reroute the received packets a second time, e.g., upon identifying another inter-domain node or link failure. As such, loops are avoided at the edge of the network and packets are rerouted to the neighboring routing domain faster and more efficiently than in prior implementations.

In accordance with an illustrative embodiment, the FRR technique is implemented at the edge of a provider network having at least two provider edge (PE) devices attached to one or more customer edge (CE) devices in a neighboring customer site. By way of example, suppose the provider edge devices PE1 and PE2 are respectively attached to customer edge devices CE1 and CE2 in the neighboring site. Next, assume that PE1 detects that it is unable to send or receive data over the PE1-CE1 data link. According to the inventive FRR technique, PE1 reroutes at least some data packets addressed to CE1 to PE2. Prior to forwarding the data packets to PE2, PE1 designates the rerouted data packets as being "protected" packets, i.e., packets that are not permitted to be rerouted a second time. PE1 designates the protected status of these packets, e.g., either by signaling their protected status to PE2 using a conventional signaling protocol or marking the packets as being protected. The protected packets are preferably tunneled within the provider network to PE2, which subsequently receives the packets, removes their protected status and forwards the packets over the PE2-CE2 data link. In the event that communications over the PE2-CE2 link are also disabled, the protected packets are "dropped" at PE2. In this way, the protected packets may not be protected or rerouted multiple times within the provider network, thereby preventing loops from forming at the edge of the network.

Further to the illustrative embodiment, a PE device may be statically or dynamically configured to identify "backup" PE devices providing alternate paths to a neighboring customer site. In a preferred embodiment, the PE device dynamically identifies backup PE devices for the customer's advertised address prefixes. To that end, the PE device may identify a backup PE device for a particular address prefix when the PE device receives the prefix from both a CE device in the neighboring customer site as well as from another PE device in the provider network. Note that if multiple PE devices advertise the same address prefix, and conventional BGP route reflectors are deployed within the provider network, then the use of unique route distinguishers (as specified in RFC 2547) is necessary. The PE device that advertised the address prefix within the provider network is then identified as the backup PE for the address prefix. In practice, the advertising PE device may be determined based on the value of a "next-hop" BGP attribute accompanying the prefix in an advertised iBGP message. Alternatively, the PE device may be statically configured, e.g., by a system administrator, to associate one or more of the customer's advertised prefixes with at least one predetermined backup PE device.

In some illustrative embodiments, the inventive FRR technique may be applied to only select address prefixes. For instance, local policy may be dynamically applied to address prefixes advertised from a customer site to determine which of the advertised prefixes are eligible for FRR protection. The local policy may specify, for example, that only prefixes associated with certain VPNs or prefixes advertised from selected customer sites may be FRR protected. Such "route coloring" also may be statically determined, e.g., by a system administrator, rather than being dynamically determined by the local policy. That is, the administrator may manually select which prefixes are eligible for FRR protection.

Advantageously, the inventive FRR technique enables at least some data packets addressed to a failed link or node to be quickly and efficiently forwarded over a backup path without having to drop the packets while a conventional exterior routing gateway protocol (BGP) converges on the changed network topology. Illustratively, the inventive FRR technique may be performed for only a predetermined period of time necessary for the BGP protocol to converge. Unlike prior implementations, the technique achieves sub-second convergence in response to CE node and PE-CE link failures between routing domains. The FRR technique is not limited to MPLS/VPN network architectures and may be used at the edge of networks implementing various topologies and protocols. Further, the invention is not limited to any particular hardware platform or set of software capabilities.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF ILLUSTRATIVE EMBODIMENTS

In accordance with the illustrative embodiments, if an edge device detects a node or link failure that prevents it from communicating with devices in a neighboring domain, the edge device reroutes at least some data packets addressed to the neighboring domain to a backup edge device. The rerouted packets are preferably "tunneled" to the backup edge device, e.g., using an IP or MPLS tunneling mechanism. After receiving the rerouted packets, the backup edge device forwards the packets to the neighboring domain. Notably, the backup edge device is not permitted to reroute the received packets a second time, e.g., upon identifying another inter-domain node or link failure. As such, packet loops are avoided at the edge of the network.

Figure 2:
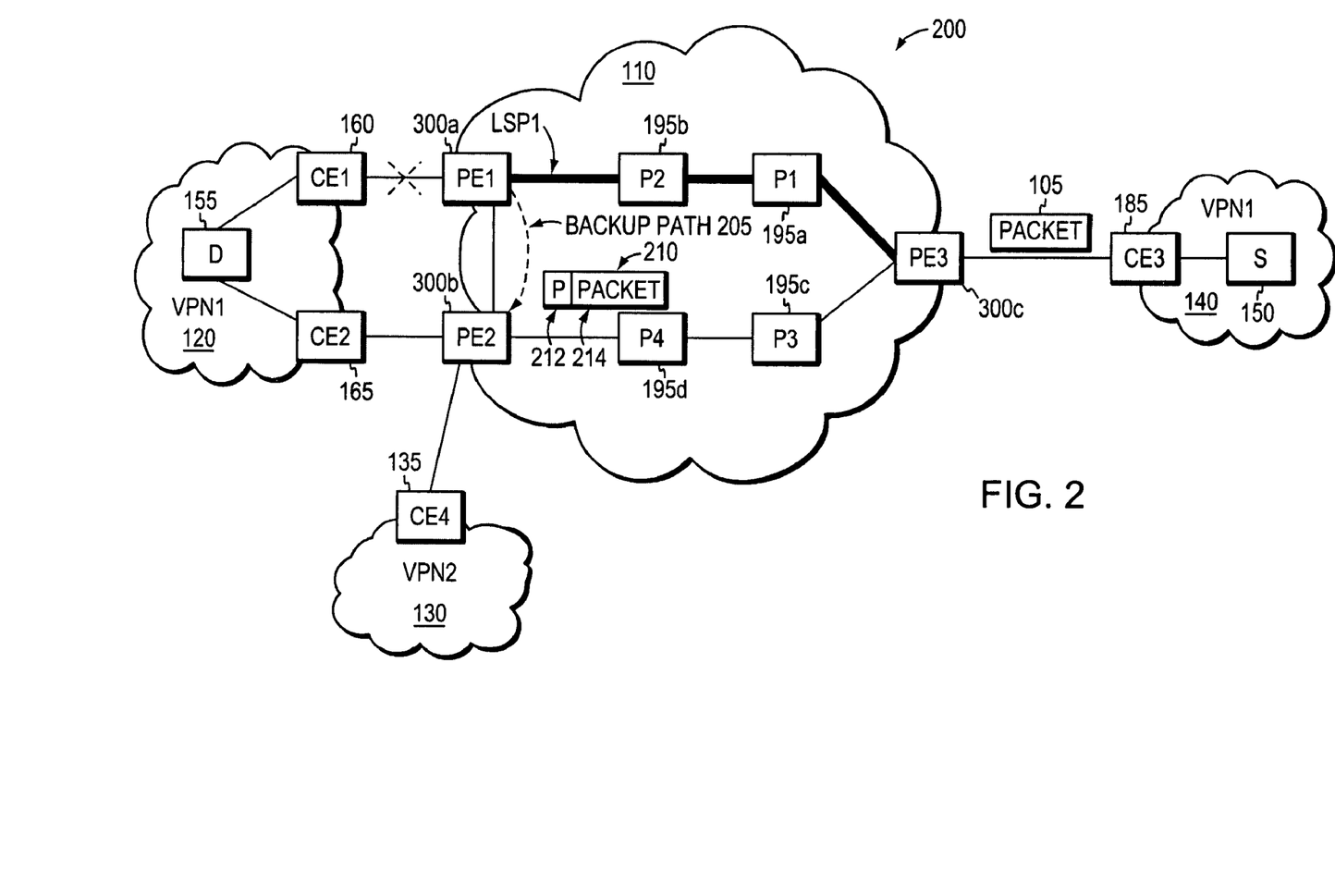
FIG. 2 is a schematic block diagram of an exemplary MPLS/VPN network topology in which the illustrative fast reroute (FRR) technique may be employed at the edge of the network. Those skilled in the art will appreciate that the network topology of FIG. 2 is merely representative and that the inventive FRR technique may be employed in other network topologies as well.

FIG. 2 illustrates a computer network 200 employing an illustrative embodiment of the invention. For ease of explanation, the network topology of network 200 is the same as that shown in FIG. 1. However, unlike in the network 100, the provider edge device PE1 does not "drop" packets upon losing communication with its neighboring customer site 120, e.g., due to a CE1 node failure or PE1-CE1 link failure.

Instead, PE1 establishes a fast reroute (FRR) backup path 205 which is used to reroute at least some packets 210 to a backup provider edge device PE2 which is also coupled to the customer site 120. Packets 210 transported over the FRR backup path 205 may be encapsulated with at least one IP tunnel header or MPLS label stack associated with the backup path.

Prior to forwarding the rerouted packets to the backup edge device PE2, the edge device PE1 designates the rerouted packets as being "protected." Here, a packet's protected status indicates that the packet is being rerouted in response to an inter-domain node or link failure. The packet's protected status may be transported concurrently with the rerouted packet 210 or may be separately sent to the provider edge device PE2, e.g., using an appropriate "out of band" signaling mechanism or protocol. For purposes of illustration, the rerouted packet 210 is shown as the concatenation of its protected status ("P") 212 and packet data ("packet") 214. The provider edge device PE2, after receiving the protected packet 210, is not permitted to reroute the packet 210 a second time in the event that it too loses communication with the customer site 120, e.g., due to a CE2 node failure or a PE2-CE2 link failure. Thus, the rerouted packets 210 cannot be circulated within loops created at the edge of the provider network 110.

Figure 3:
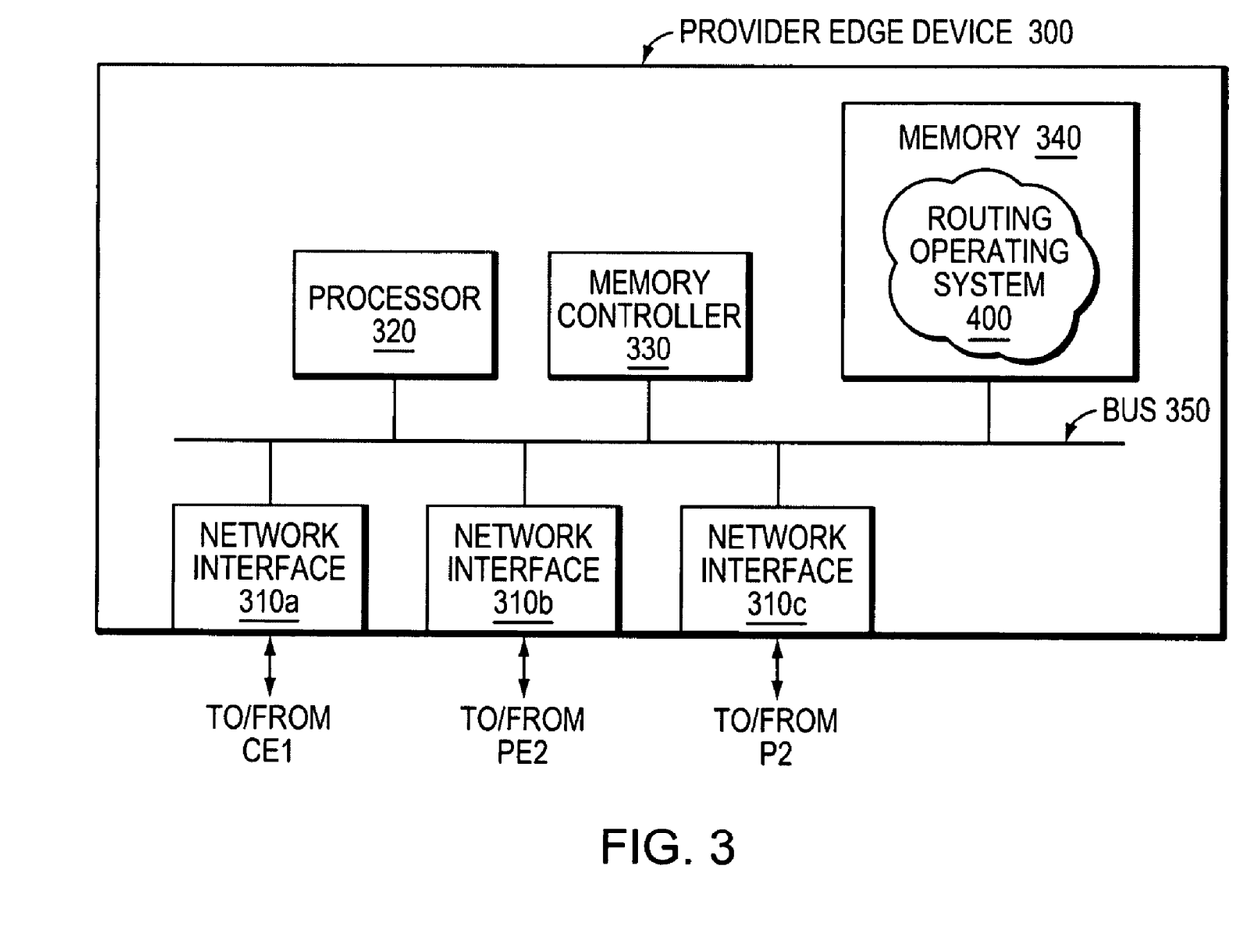
FIG. 3 is a schematic block diagram of a provider edge (PE) device which may implement FRR operations at the edge of a MPLS/VPN network.

FIG. 3 is a schematic block diagram of an exemplary provider edge device 300, such as a router, that may be advantageously used with the present invention. Suitable intermediate nodes that may be used with the present invention include, but are not limited to, the Cisco 7200 and 7600 Series Routers and Catalyst 6500 Series Switches available from Cisco Systems Incorporated, San Jose, Calif. For ease of illustration and description, the PE device 300 is illustrated on a generic hardware platform. However, in alternative embodiments, the PE device may contain a plurality of line cards which are interconnected with a route processing engine through a switching fabric (i.e., backplane logic and circuitry). Accordingly, those skilled in the art will appreciate that the depicted PE device 300 is merely exemplary and that the advantages of the present invention may be realized on a variety of different hardware platforms having various software capabilities.

The PE device 300 comprises one or more network interfaces 310, a processor 320, a memory controller 330 and a memory 340 interconnected by a system bus 350. Each network interface 310 may be a physical or logical interface that connects the PE device 300 with a neighboring node. For example, as shown, the network interface 310a is coupled to the customer edge device CE1 located in the customer site 120. The network interfaces 310b and 310c are respectively coupled to the devices PE2 and P2 in the provider network 110. Each network interface 310 may be adapted to transfer and acquire data packets to and from various transport media such as, e.g., Fast Ethernet (FE), Gigabit Ethernet (GE), wireless links, optical links, etc. Functionally, the interfaces 310 may be configured to communicate using various network communication protocols, including but not limited to Asynchronous Transfer Mode (ATM), Ethernet, frame relay (FR), multi-channel T3, synchronous optical network (SONET), Fibre Distributed Data Interface (FDDI), and so forth.

The memory 340 comprises a plurality of storage locations that are addressable by the processor 320 and the network interfaces 310 via the memory controller 330. The memory 340 preferably comprises a form of random access memory (RAM) that is generally cleared by a power cycle or other reboot operation (e.g., it is a "volatile" memory). For instance, the memory 340 may comprise dynamic RAM (DRAM) and/or synchronous DRAM (SDRAM) storage locations adapted to store program code and data structures accessible to the processor 320. It will be apparent to those skilled in the art that the memory 340 also may comprise other memory means, including various computer-readable media, for storing program instructions and data structures pertaining to the operation of the PE device 300. Further, those skilled in the art will appreciate that at least some portions of the memory 340 may be embodied as electromagnetic signals that are transmitted from a remote memory element to the PE device 300.

The memory 340 stores, among other things, computer-readable instructions for implementing a routing operating system 400 that functionally organizes the PE device 300 by, e.g., invoking network operations in support of software processes and services executing on the processor 320. The IOS™ operating system by Cisco Systems Incorporated is one example of an operating system 400 that may be stored in the memory 340 and executed in accordance with the illustrative embodiments herein. The IOS operating system includes various routing services, such as conventional interior and exterior gateway protocols. The present invention also may be deployed with other operating systems, such as the IOS-XR™ operating system by Cisco Systems Incorporated, in which one or more of these routing services is executed as a separate process, i.e., having its own process address space apart from the operating system's.

Figure 4:
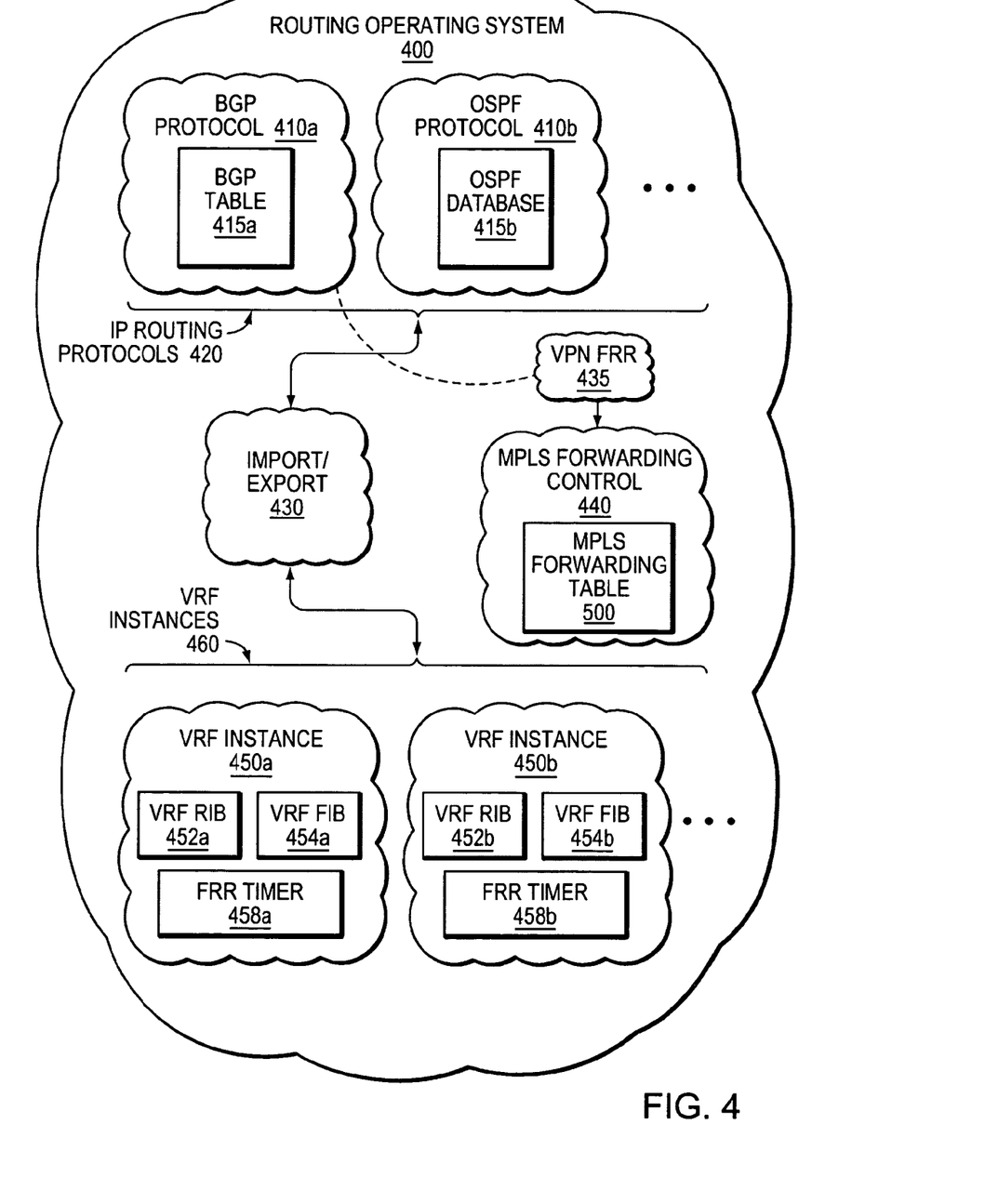
FIG. 4 is a schematic block diagram of an illustrative operating system that may be executed in a PE device configured in accordance with the illustrative embodiments of the invention.

FIG. 4 illustrates an exemplary operating system 400 that may be employed by the PE device 300. The operating system includes various routing services including a set of IP routing protocols 420, an import/export service 430, virtual private network (VPN) FRR service 435, MPLS forwarding control 440 and a set of virtual routing and forwarding (VRF) instances 460. The IP routing protocols 420 enable the PE device to exchange IP-based routing information with other P and PE devices in the provider network 110. For instance, the IP protocols may implement conventional interior and exterior gateway protocols such as the BGP protocol 410a and the OSPF protocol 410b. Each IP protocol 410 may be configured to store its topology and routing information in at least one protocol-specific table or database 415, e.g., stored in the memory 340. For example, the BGP protocol 410a may utilize a BGP table 415a, and the OSPF protocol 410b may maintain an OSPF database 415b and so forth.

The MPLS forwarding control 440 is configured to establish label switched paths (LSP) between the PE device 300 and other PE devices in the provider network 110. To that end, the MPLS forwarding control exchanges label-based routing information with the other P and PE devices. Specifically, the MPLS forwarding control cooperates with its neighboring P devices to distribute interior gateway protocol (IGP) labels using, e.g., the LDP or RSVP protocols, and further cooperates with its fully-meshed PE devices to distribute VPN labels using, e.g., the MP-BGP protocol. As used herein, an IGP label identifies an individual "hop" between label switched routers for a destination LSP, and a VPN label identifies a particular customer-site VPN route from a given PE device. Thus, a data packet 105 communicated within the provider network 110 typically includes a MPLS label stack having an IGP label that identifies the packet's exit point from the provider network and a VPN label indicating the packet's associated VPN route.

Figure 5:
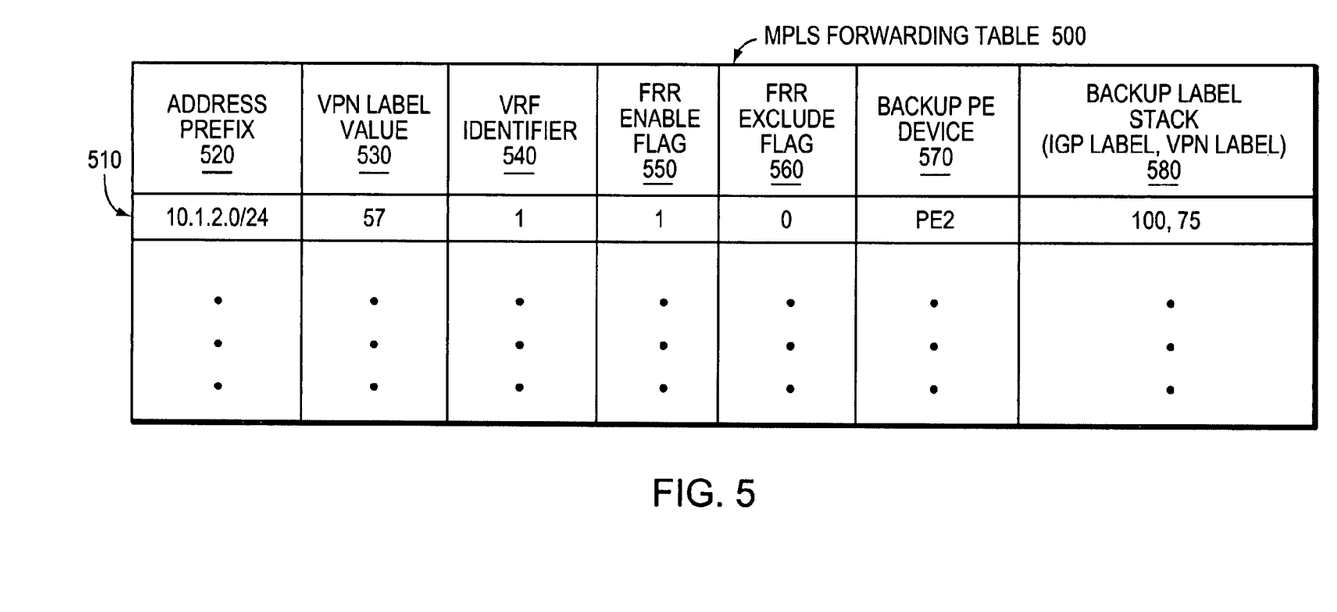
FIG. 5 is a schematic block diagram of an illustrative Multi-Protocol Label Switching (MPLS) forwarding table configured to store FRR-related information.

The MPLS forwarding control 440 maintains a MPLS forwarding table 500 (or "label forwarding information base (LFIB)") that stores label information used to forward data packets from the PE device 300 to neighboring customer sites. The MPLS forwarding table 500 is also configured to store FRR-related information as described in more detail below. The MPLS forwarding control may employ a separate label forwarding table (not shown) for storing label information used to forward data packets within the provider network 110. When the PE device 300 receives a data packet 105 from a P or PE device in the provider network 110, the MPLS forwarding control 440 may locate a VPN label value in the received packet's MPLS label stack. The MPLS forwarding control 440 performs a label lookup operation in its forwarding table 500 based on the packet's VPN label value. The result of the lookup operation can be used to determine a particular PE-CE link over which the packet should be forwarded next.

The set of VRF instances 460 includes one or more separate VRF instances 450, such as the VRF instances 450a and 450b. Each VRF instance manages routing and forwarding operations between the PE device 300 and a selected set of one or more neighboring customer sites, either locally or remotely attached to the provider network 110. For ease of description, it is assumed that each VRF instance 450 is associated with a single customer site and performs packet-forwarding decisions for data packets transmitted to and received from that customer site. Thus, the illustrative embodiments described hereinafter will assume that the routing operating system 400 instantiates a separate VRF instance 450 for every customer site directly attached to the PE device 300. For example, in FIG. 2, the provider edge device PE2 300b may execute separate VRF instances for each of its two neighboring customer sites 120 and 130. In alternate embodiments, VRF instances may be instantiated on a per-VPN basis or in other ways consistent with the network topology.

Each VRF instance 450 includes a VRF-specific routing information base (RIB) 452 and a VRF-specific forwarding information base (FIB) 454. Thus, the VRF instances 450a and 450b respectively include the VRF-specific RIBs 452a and 452b and FIBs 454a and 454b. Each VRF RIB 452 stores layer-3 routing information for address prefixes reachable in its VRF instance's associated customer site, including address prefixes advertised by the customer site as well as prefixes advertised by other sites participating in the same VPN as the customer site. The VRF FIBs 454 store forwarding information for IP destinations stored in their associated VRF RIBs. The VRF instances 460 and BGP protocol 410a interface with the import/export service 430 to ensure that the VRF RIBs 452 and the BGP table 415a store consistent sets of routing information. For instance, the import/export service may copy VPN-related routing information from the BGP table and store the VPN routing information in appropriate VRF RIBs. Similarly, the import/export service may redistribute routing information stored in the VRF RIBs into the BGP table.

In accordance with the illustrative embodiments, each VRF instance 450 includes a FRR timer 458 which determines a time duration for which FRR operations are performed in response to, e.g., a failed CE node or a PE-CE link failure at the VRF instance's associated customer site. For example, the VRF instances 450a and 450b are associated with respective FRR timers 458a and 458b. Alternatively, a single FRR timer 458 may be made available to each VRF instance 450. In operation, after the routing operating system 400 detects an inter-domain communication failure at a neighboring customer site, the VPN FRR service 435 starts the FRR timer 458 associated with the inaccessible customer site. Thereafter, the operating system implements FRR operations for data packets addressed to the inaccessible customer site. The FRR operations continue until the FRR timer expires, at which time normal (non-FRR) routing operations resume and the network is assumed to have converged on its new network topology, i.e., without the failed CE node or PE-CE link.

FIG. 5 illustrates an exemplary MPLS forwarding table 500 that may be used in accordance with an illustrative embodiment of the invention. The table 500 includes a plurality of table entries 510, each of which is configured to store, among other things, an address prefix value 520, a VPN label value 530, a VRF identifier value 540, a "FRR enable" flag value 550, a "FRR exclude" flag value 560, a backup PE device identifier 570 and a backup MPLS label stack 580. The address prefix value 520 stores an IP address prefix that is reachable to the PE device 300 from a directly-attached CE device. The VPN label value 530 identifies which VPN includes the address prefix value 520. The VRF identifier value 540 identifies to which VRF instance the address prefix belongs and thus which VRF instance should be used to forward data packets having destination IP addresses matching the address prefix value 520.

Suppose the PE device 300 receives an advertisement message, such as a BGP update message or link-state advertisement, at a network interface 310 directly attached to a neighboring CE device. The received advertisement is initially processed within a routing context of the VRF instance 450 associated with the customer site containing the CE device. Because the received advertisement message is not a data packet to be forwarded into the provider network, the routing protocol context for the VRF instance's associated VPN updates its protocol-specific tables or databases 415 based on reachability information in the advertisement message. After updating its protocol-specific tables and databases, the IP routing protocol 410 performs its "best-path" calculation on its tables and databases and then provides its results to the VRF RIB 452 which then redistributes its best-path per prefix processing results to the MP-BGP protocol. The MP-BGP protocol may propagate reachability information to the other fully-meshed PE devices so they, too, can update their local routing information.

The MPLS forwarding control is provided with a VPN label value for the address prefixes advertised by the CE device, assuming that such a VPN label value has not already been allocated. The MPLS forwarding control stores the address prefix values 520 together with their allocated VPN label values 530 in appropriate MPLS forwarding table entries 510. Each of these table entries also includes a VRF identifier value 540 identifying the VRF instance that initially received the advertisement message from the CE device.

The CE device's advertised address prefixes and their associated VPN label values are disseminated to the other PE devices in the provider network 110, e.g., in one or more MP-BGP messages. As such, the other PE devices are notified that data packets having destination IP addresses matching any of these advertised address prefixes should include the prefixes' associated VPN label values. Subsequently, when a data packet 105 is received at the PE device 300 from a P or PE device, the received data packet's destination IP address and VPN label value can be used to index a matching table entry 510 in the MPLS forwarding table 500. The matching table entry's VRF identifier 540 identifies which VRF instance 450 should forward the received data packet to its next hop in a neighboring customer site.

The FRR enable flag 550 stores a value indicating whether FRR operations are currently being performed for data packets containing the address prefix 520. When the operating system 400 detects a node or link failure over a PE-CE data link, the operating system's VPN FRR service 435 sets the FRR enable flag values for those IP address prefixes 520 that were reachable over the failed PE-CE link. As used herein, the FRR enable flag 550 is "set" when it equals a first predetermined value (e.g. "1"). Otherwise, the FRR enable flag equals a second predetermined value (e.g., "0"). In this way, the value of the FRR enable flag 550 associated with a given address prefix 520 indicates whether FRR operations have been initiated for data packets 105 having destination IP addresses matching that address prefix.

Figure 6:
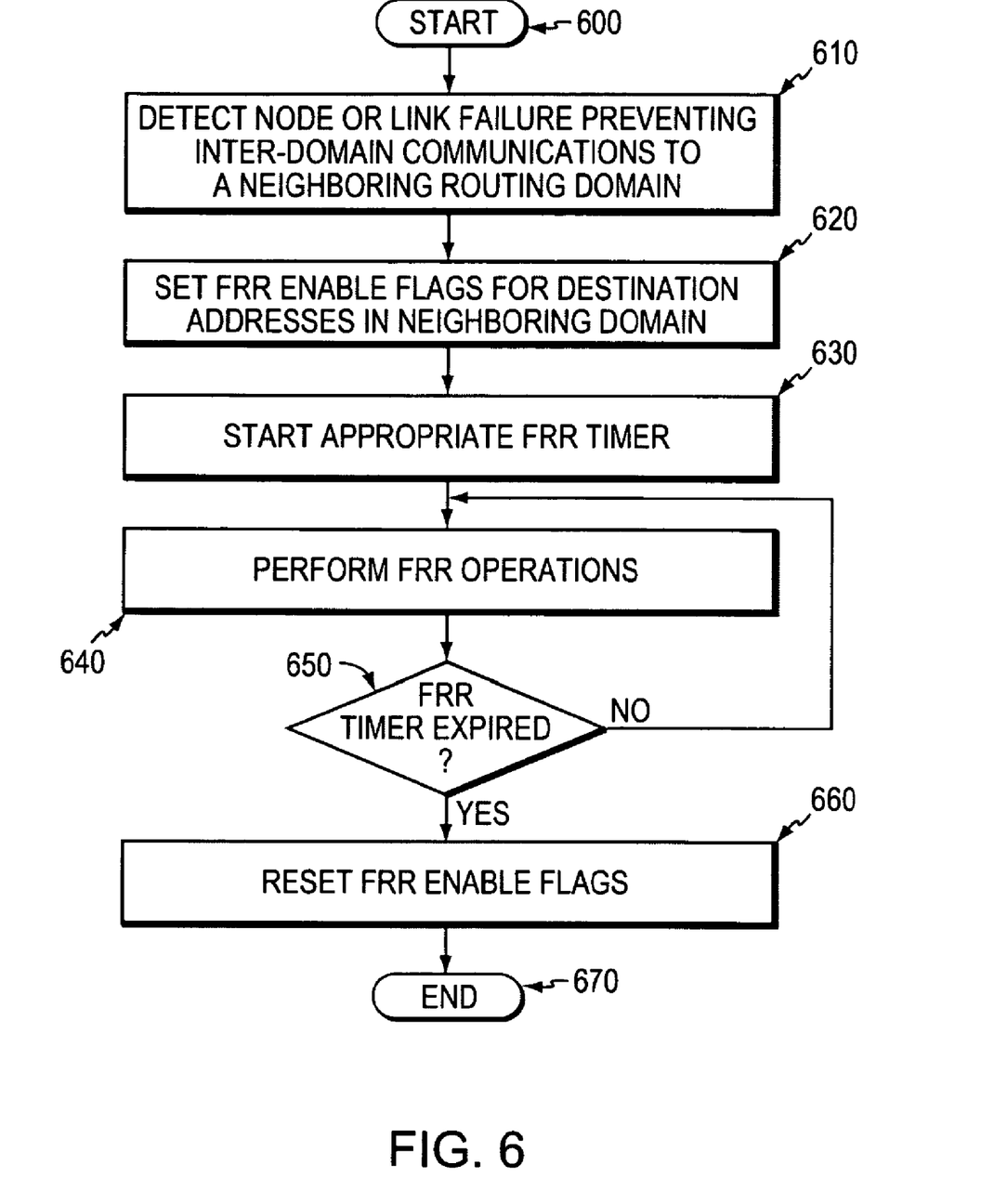
FIG. 6 is a flowchart illustrating a sequence of steps for implementing FRR operations for a predetermined time interval.

FIG. 6 is a flowchart illustrating a sequence of steps for initiating FRR routing operations using the FRR enable flags 550. The sequence starts at step 600 and proceeds to step 610 where the routing operating system 400 detects a node or link failure preventing inter-domain communications with a neighboring routing domain. For instance, the operating system may determine that packets are no longer being received at a network interface 310 connected to the neighboring customer site or may receive an explicit notification, e.g., indicating that a CE device will soon go "off-line" or is otherwise about to fail. The operating system's IP routing protocols 420, such as the BGP protocol 410a, may be used to communicate this detected topology change to the other fully-meshed PE devices in the provider network 110.

At step 620, the operating system's VPN FRR service 435 "walks through" the MPLS forwarding table 500 to locate table entries 510 containing VRF identifier values 540 corresponding to the customer site that was made inaccessible as a result of the failed PE-CE data link. For each such located table entry 510, the entry's FRR enable flag value 550 is set, thereby indicating that FRR operations should be performed for packets containing destination IP addresses matching the entry's address prefix 520. Next, at step 630, the operating system starts an appropriate FRR timer 458, i.e., corresponding to the VRF instance whose identifier 540 is stored in the located table entries.

At step 640, FRR operations are performed for data packets having destination IP addresses and VPN label values matching MPLS forwarding table entries 510 whose FRR enable flags 550 are set. The operating system determines whether the FRR timer 458 has expired, at step 650. If not, the sequence returns to step 640 and FRR operations continue. Otherwise, at step 660, the previously-set FRR enable flags are reset to indicate that FRR operations are no longer being performed for data packets addressed to the inaccessible customer site. The sequence ends at step 670.

Referring again to FIG. 5, the FRR exclude flag 560 stores a value indicating whether FRR operations should not be performed even when the FRR enable flag 550 is set. The FRR exclude flag may equal a first predetermined value (e.g. "1") to indicate that FRR operations are not permitted to be performed and may equal a second predetermined value (e.g., "0") otherwise. The value of the FRR exclude flags 560 may be manually selected, e.g., by a system administrator. However, in a preferred embodiment, the FRR exclude flag values are dynamically determined by the routing operating system 400. The operating system's VPN FRR service 435 may be configured to execute local policy that implements a set of rules for determining which addresses prefixes 520 are eligible for FRR protection. The local policy may specify, for example, that only address prefixes advertised by selected customer sites or by customer sites participating in certain VPNs may be FRR protected. After applying its local policy to the address prefixes 520 stored in the table 500, the operating system sets the FRR exclude flags 560 for those prefixes that the local policy determines are ineligible for FRR protection.

A set of one or more backup PE devices 570 may be associated with each address prefix 520 stored in the table 500. Each backup PE device may be associated with a backup label stack 580, e.g., including IGP and VPN label values, that should be included in FRR rerouted packets 210 matching the address prefix 520 and VPN label value 530. The backup label stack 580 may be determined based on the contents of a separate label forwarding table (not shown) configured to store label information used to forward data packets within the provider network 110. For example, as shown in table 500, the backup PE device 570 indicates that PE2 is a backup PE device for the address prefix 10.1.2.0/24 which is reachable in the VPN associated with the VPN label value 57. Further, the illustrated backup label stack 580 indicates that FRR data packets forwarded to PE2 should include an IGP label value equal to 100 and a VPN label value equal to 75. Here, it is also noted that the exemplary FRR flags 550 and 560 in the illustrated table entry 510 indicate that FRR operations are currently underway for the address prefix 10.1.2.0/24 and that FRR operations have not be excluded.

The backup PE devices 570 and their backup label stacks 580 may be statically configured, e.g., by a system administrator. However, the backup PE devices are preferably dynamically "learned" (acquired) by the operating system 400. Specifically, the operating system automatically learns a backup PE device for a particular address prefix 520 when the address prefix has been received from both (i) a directly connected (i.e., neighboring) customer site and (ii) another PE device in the provider network 110. The PE device that advertised the address prefix within the provider network is then identified as a backup PE device for data packets addressed to the directly-connected customer site.

Preferably, the operating system's VPN FRR service 435 identifies backup PE devices 570 by monitoring the contents of the BGP table 415a. Conventionally, the BGP table stores reachability information (i.e., address prefixes) advertised to the PE device 300 as well as indications of which network devices advertised the reachability information. Accordingly, if the VPN FRR service's scan of the BGP table 415a detects that an address prefix 520 is reachable to the PE device 300 from both a directly-connected CE device and from a remote PE device, the VPN FRR service 435 stores an identifier (such as an IP address) corresponding to the remote PE device as the backup device 570 for the address prefix 520 in the MPLS forwarding table 500.

Figure 7:
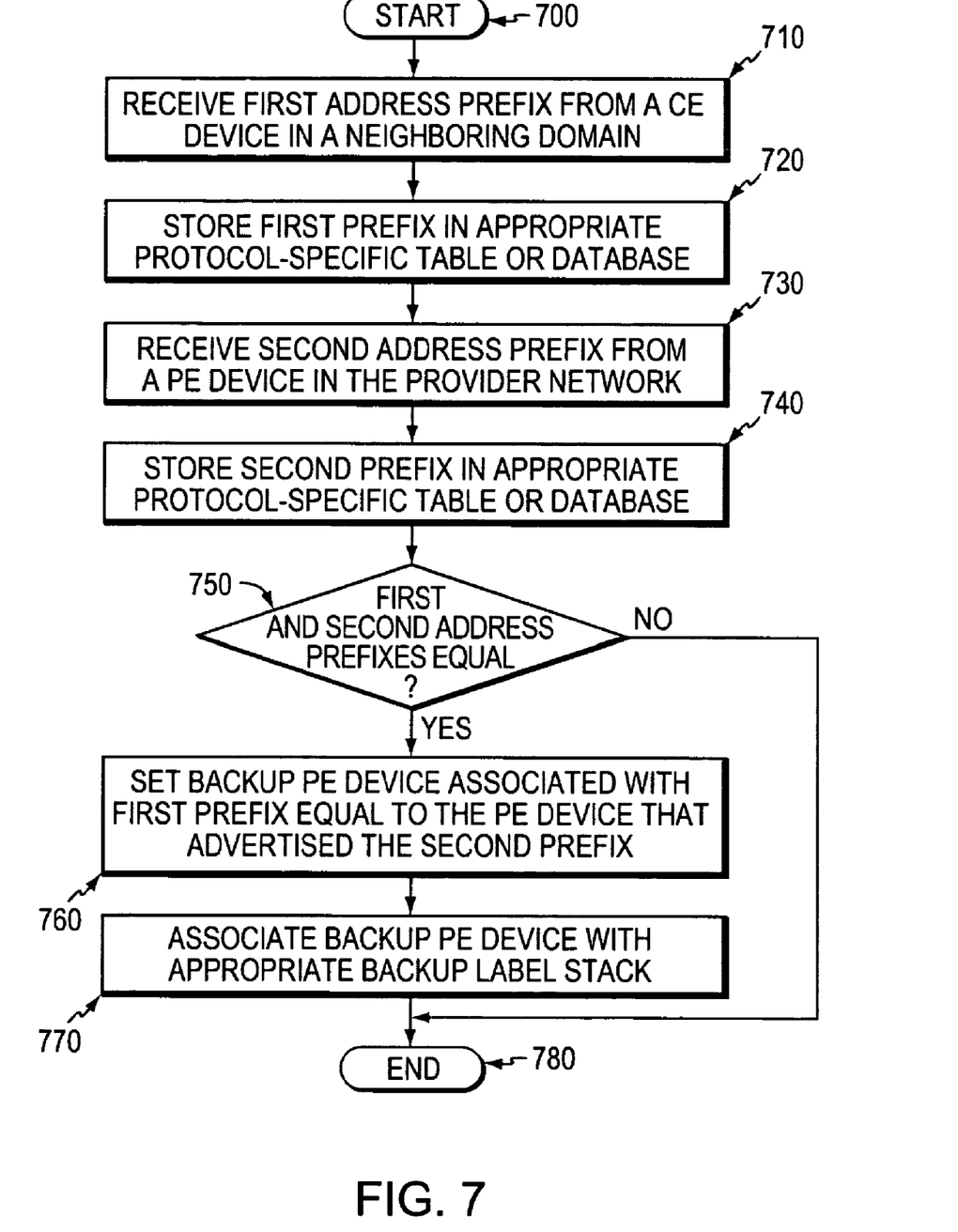
FIG. 7 is a flowchart illustrating a sequence of steps for dynamically identifying a backup PE device for a reachable IP address prefix.

FIG. 7 is a flowchart illustrating a sequence of steps that may be performed by a PE device 300 that automatically identifies a backup PE device for a reachable address prefix. The sequence starts at step 700 and proceeds to step 710 where an advertisement message containing a first address prefix is received at a network interface 310 directly connected to a CE device in a neighboring routing domain. At step 720, the first address prefix is stored in an appropriate protocol-specific table or database. Here, it is assumed that the first address prefix is received in a BGP update message and is therefore stored in the BGP table 415a. Next, at step 730, the PE device 300 receives a second address prefix at a network interface 310 attached to a remote PE device. The second address prefix is stored in an appropriate protocol-specific table, e.g., the BGP table, at step 740.

Next, at step 750, the VPN FRR service 435 scans the contents of the BGP table 415a to determine whether the received first and second address prefixes are equal. If they are not equal, the sequence ends at step 780. However, if the VPN FRR service detects that the first and second address prefixes are the same address prefix, then at step 760 the VPN FRR service updates the prefix's associated MPLS forwarding table entry 510 to indicate that the remote PE device is a backup PE device 570 for the address prefix. The VPN FRR service 435 identifies an appropriate backup label stack 580, at step 770, to include in FRR rerouted data packets matching the address prefix 520. The sequence ends at step 780.

Figure 8:
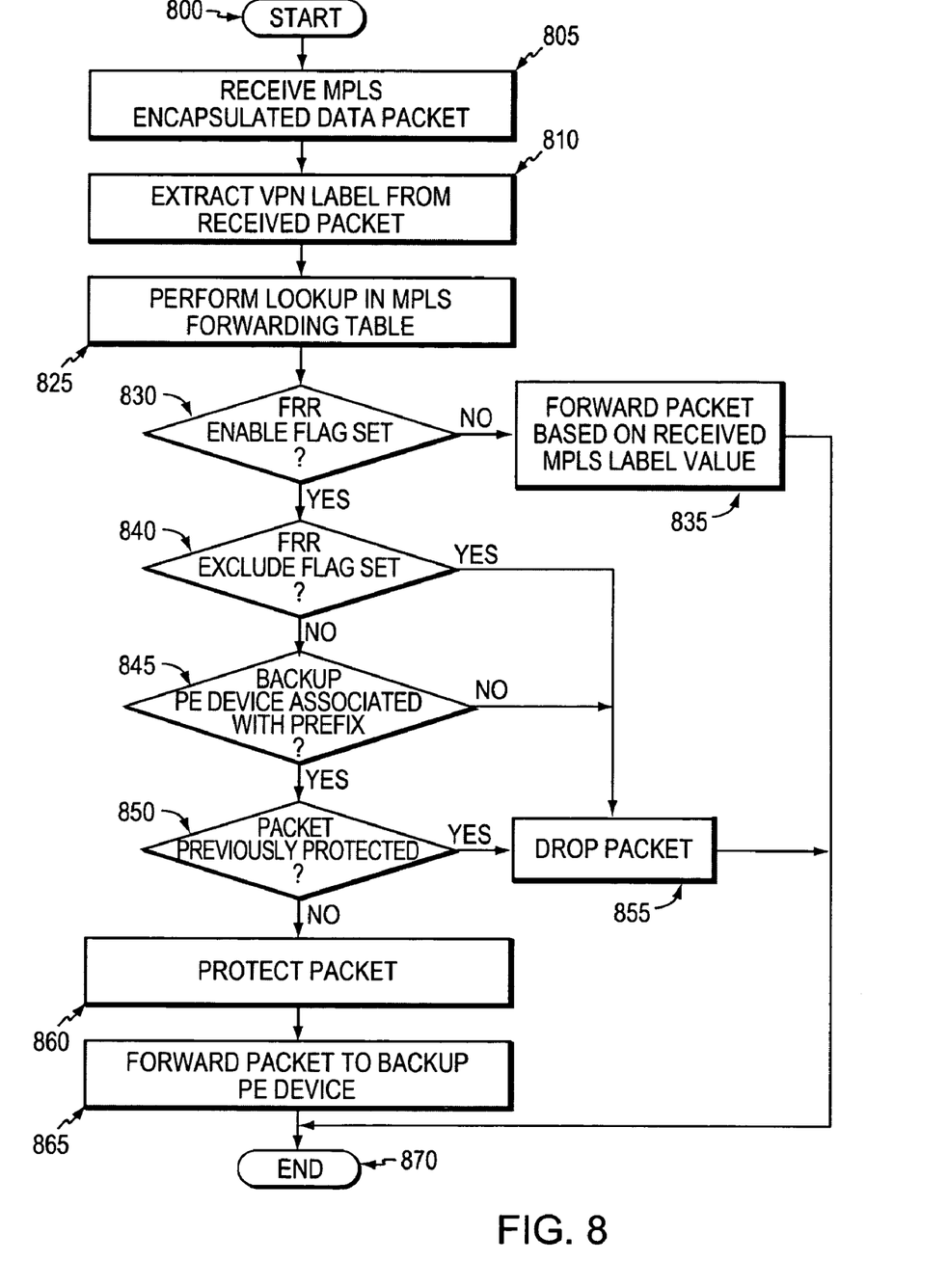
FIG. 8 is a flowchart illustrating a sequence of steps for performing FRR operations at the edge of a network in accordance with an illustrative embodiment of the invention.

FIG. 8 illustrates a flowchart containing a sequence of steps for performing the FRR technique of the present invention. The sequence begins at step 800 and proceeds to step 805 where a MPLS encapsulated data packet is received at a PE device 300. The received packet is forwarded to the MPLS forwarding control 440 which extracts a VPN label value from the received packet, at step 810, and uses these extracted values to perform a lookup operation in its MPLS forwarding table 500, at step 825. Specifically, a MPLS forwarding table entry 510 is located having an address prefix 520 matching the packet's destination IP address and a VPN label value 530 equal to the packet's extracted VPN label value.

At step 830, the FRR enable flag 550 in the located table entry 510 is analyzed to determine whether FRR operations are currently being performed for packets containing the received VPN label value. If FRR operations are not currently underway, the received packet is processed based on the forwarding entry 510 within the MPLS forwarding table 500. The received data packet is then forwarded to its next-hop destination at step 835. The sequence ends at step 870.

If, at step 830, the value of the FRR enable flag indicates that FRR operations should be performed, then at step 840 the FRR exclude flag 560 is analyzed to determine whether the packet is permitted to be FRR rerouted. If the packet is not allowed to be rerouted, the packet is dropped at step 855 and the sequence ends at step 870. When the FRR exclude flag value indicates that FRR operations may be performed for the received packet, the sequence advances to step 845 where it is determined whether there is a backup PE device 570 identified in the received packet's matching MPLS forwarding table entry 510. If no such backup PE device exists, then at step 855 the packet is dropped and the sequence ends at step 870.

At step 850, the routing operating system 400 determines whether the received packet has been previously FRR protected. For instance, the packet's protected status may be ascertained based on FRR status information transported in a P field 212 of the received packet. In accordance with the inventive FRR technique, a protected packet may not be protected a second time. Therefore, if at step 850 the received packet is determined to already have been protected, the packet is dropped at step 855 and the sequence ends at step 870. On the other hand, if the packet was not previously protected, the sequence advances to step 860 and the packet is protected. For instance, a FRR protected designation may be concatenated to or incorporated into the packet, or the packet's backup PE device 570 may be separately "signaled" of the packet's protected status, e.g., using an appropriate signaling protocol. The protected packet is forwarded to its backup PE device, at step 865, preferably via a MPLS or IP tunnel. The sequence ends at step 870.

Advantageously, the inventive FRR technique enables at least some data packets addressed to a failed PE-CE link or CE node to be quickly and efficiently forwarded over a backup path without having to drop the packets while a conventional exterior gateway protocol (BGP) converges on the changed network topology. Illustratively, the inventive FRR technique may be performed for only a predetermined period of time necessary for the BGP protocol to converge. Unlike prior implementations, the technique achieves sub-second convergence in response to CE node and PE-CE link failures between routing domains. The FRR technique is not limited to MPLS/VPN network architectures and may be used at the edge of networks implementing various topologies and protocols. Further, the invention is not limited to any particular hardware platform or set of software capabilities.

The foregoing has been a detailed description of illustrative embodiments of the invention. Various modifications and additions can be made without departing from the spirit and scope of the invention. For example, while the inventive FRR technique has been illustratively described with respect to MPLS/VPN networks, it is also expressly contemplated that the invention may be deployed at the edge of other types of networks and subnetworks, such as autonomous systems, broadcast domains, routing areas, etc., that implement various network communication protocols. Although the illustrative embodiments described herein assume a one-to-one correspondence between customer sites and VPNs, those skilled in the art will understand that the FRR technique also may be deployed in networks in which customer sites are permitted to participate in more than one VPN. Similarly, at least some VRF instances 450 may be associated with customer sites on a one-to-many basis, even though the illustrative embodiments, for simplicity, have assumed a one-to-one correspondence.

Furthermore, the illustrative embodiments may be modified to utilize IP Version 6 (IPv6) technology. The IPv6 protocol has been introduced to increase the number of available network addresses and provide additional services at the internetwork layer of the conventional TCP/IP protocol stack. The IPv6 protocol employs a larger address space than its IPv4 predecessor, and utilizes 128 bit (sixteen byte) values to address network nodes rather than the 32 bit addresses employed by IPv4. Those skilled in the art will appreciate that the illustrative embodiments described herein are equally applicable to other address formats, including IPv6 addresses.

It is expressly contemplated that the teachings of this invention can be implemented as software, including a computer-readable medium having program instructions executing on a computer, hardware, firmware, or a combination thereof. For instance, the invention may be implemented by a PE device 300 having one or more processors, some of which may reside on the network interfaces 310 or on line cards containing the network interfaces. Further, the memory 340 may be distributed among a plurality of different memory elements, both local and remote to the PE device 300. In general, the inventive technique therefore may be implemented in various combinations of hardware and/or software. Accordingly, this description is meant to be taken only by way of example and not to otherwise limit the scope of the invention.

What is claimed is:

1. An edge device in a first routing domain, comprising:
a first network interface configured to communicate with a second routing domain via a data link;
a second network interface configured to receive a data packet containing a destination address that is reachable via the second routing domain and an indication that the data packet is a protected packet that was previously rerouted from another edge device in the first routing domain via a Multi-Protocol Label Switching (MPLS) Fast Reroute (FRR) backup path; and
a processor configured to determine if communication with the second routing domain is still available via the data link, and if so, remove the indication that the data packet is a protected packet and forward the data packet over the first network interface to the second routing domain, and, if not, drop the data packet to prevent the data packet from being rerouted a second time in the first routing domain on another MPLS FRR backup path.

2. The edge device of claim 1 wherein the indication that the data packet is a protected packet is included in a status information field concatenated to the data packet.

3. The edge device of claim 1 wherein the edge device is a provider edge device, the another edge device is an another provider edge device, the first routing domain is a provider network and the second routing domain is a customer network.

4. The edge device of claim 2, wherein the data link is a provider edge device to customer edge device data link.

5. The edge device of claim 1 wherein the data packet was previously rerouted from the another edge device to the edge device in response to a loss of communication between the another edge device and the second routing domain.

6. A system comprising:
a first edge device in a first routing domain;
a second edge device in the first routing domain;
a data link coupling the second edge device to a second routing domain; and
a Multi-Protocol Label Switching (MPLS) Fast Reroute (FRR) backup path coupling the first edge device to the second edge device,
wherein the second edge device is configured to receive a data packet from the first edge device via the MPLS FRR backup path, the data packet containing a destination address that is reachable via the second routing domain and an indication that the data packet is a protected packet that was previously rerouted from the first edge device,
wherein the second edge device is further configured to determine if communication with the second routing domain is still available via the data link, and if so, remove the indication that the data packet is a protected packet and forward the data packet over the second data link to the second routing domain, and, if not, drop the data packet to prevent the data packet from being rerouted a second time in the first routing domain on another MPLS FRR backup path.

7. The system of claim 6 wherein the indication that the data packet is a protected packet is included in a status information field concatenated to the data packet.

8. The system of claim 6 wherein the first edge device is a provider edge device, the second edge device is a second provider edge device, the first routing domain is a provider network and the second routing domain is a customer network.

9. The system of claim 8, wherein the data link is a provider edge device to customer edge device data link.

10. The system of claim 6 further comprising:
an additional data link coupling the first edge device to the second routing domain,
wherein the data packet was previously rerouted from the first edge device in response to a loss of communication between the first edge device and the second routing domain on the additional data link.

11. The system of claim 6 further comprising:
a timer at the first edge device, the timer configured to start in response to a loss of communication between the first edge device and the second routing domain,
wherein the first edge device is configured to reroute data packets to the second edge device via the MPLS FRR backup path until the timer expires.

12. The system of claim 6 wherein the first edge device is configured to automatically detect that the second edge device is coupled to the second routing domain via the data link.

13. An edge device in a first routing domain, comprising:
means for communicating with a second routing domain;
means for receiving a data packet containing a destination address that is reachable via the second routing domain and an indication that the data packet is a protected packet that was previously rerouted from another edge device in the first routing domain via a Multi-Protocol Label Switching (MPLS) Fast Reroute (FRR) backup path; and
means for determining if communication with the second routing domain is still available, and if so, forwarding the data packet over the means for communicating to the second routing domain, and, if not, dropping the data packet to prevent the data packet from being rerouted a second time in the first routing domain on another MPLS FRR backup path.

14. The edge device of claim 13 wherein the indication that the data packet is a protected packet is included in a status information field concatenated to the data packet.

15. A method comprising:
receiving, at an edge device in a first routing domain, a data packet containing a destination address that is reachable via a second routing domain and an indication that the data packet is a protected packet that was previously rerouted from another edge device in the first routing domain via a Multi-Protocol Label Switching (MPLS) Fast Reroute (FRR) backup path; and
determining if communication with the second routing domain is still available, and
if so, removing the indication that the data packet is a protected packet and forwarding the data packet to the second routing domain, and,
if not, dropping the data packet to prevent the data packet from being rerouted a second time in the first routing domain on another MPLS FRR backup path.

16. The method of claim 15 wherein the indication that the data packet is a protected packet is included in a status information field concatenated to the data packet.

17. The method of claim 15 wherein the edge device is a provider edge device, the another edge device is an another provider edge device, the first routing domain is a provider network and the second routing domain is a customer network.

18. The method of claim 15, wherein the determining if communication with the second routing domain is still available determines if a data link to the second routing domain is still operational.

19. The method of claim 18, wherein the data link is a provider edge device to customer edge device data link.

20. The method of claim 15 wherein the data packet was previously rerouted from the another edge device to the edge device in response to a loss of communication between the another edge device and the second routing domain.

* * * * *